United States Patent Office 3,299,071
Patented Jan. 17, 1967

3,299,071
6-AMINONAPHTH[2,3-c]ACRIDAN-5,8,14-TRIONES
Joseph William Fitzpatrick, Pine Beach, N.J., assignor to Toms River Chemical Corporation, Toms River, N.J., a corporation of Delaware
No Drawing. Filed Sept. 27, 1963, Ser. No. 311,955
3 Claims. (Cl. 260—276)

This invention relates to novel blue and green dyestuffs and to the use of such dyestuffs in coloring polyester fibers.

Polyester fibers present particular dyeing problems, arising at least in part out of the hydrophobic nature of such fibers. In the dyeing of polyester fibers, the class of dyes known as disperse dyestuffs has come to have the widest application. These dyestuffs are essentially water-insoluble products applied in a finely divided condition from a dispersion. In the application of such dyestuffs, the dyeing difficulties associated with polyester fibers have been met by the development of special methods for the application of disperse dyes to the fibers. Of these methods, the one known as the Pad/Thermofix method has become of increasing importance since it is particularly adapted for high-speed, continuous dyeing operations. In this method, a fabric is padded by passing it through an aqueous suspension of the dyestuff and squeezing the fabric between closely-set rollers in order to remove excess dye liquor. The dyestuff is only loosely attached to the fiber at this point. The dyestuff is then fixed on the fiber by subjecting the material to a short, intensive heat-treatment at elevated temperatures of the order of about 120–220° C. It is evident that a dyestuff, in order to be suitable for application by this method, must be fast to sublimation or else it will wholly or partially volatilize from the fiber during the heat-treatment step. The result of such sublimation will be a loss of color value on the polyester fiber and, if a union dyeing operation is being carried out, the staining of the other fibers, such as cotton, which may be present in the blend.

The problems associated with the dyeing of polyester fibers, especially polyethylene terephthalate, have been particularly troublesome with respect to the provision of suitable blue and green dyestuff for this purpose.

In accordance with the present invention, it has been found that 6-aminonaphth(2,3-c)acridan-5,8,14-triones having the formua:

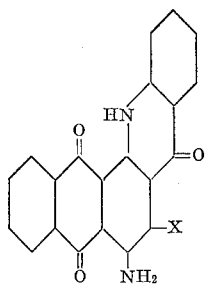

in which X is cyano or carboxamide, give green and blue dyeings on polyester fibers of excellent light fastness and outstanding fastness to sublimation. These dyestuffs are very readily applicable by the Pad/Thermofix method and provide good tinctorial value and strength build-up.

The dyestuffs of this invention are of particular interest in that they provide green and blue dyeings of desirable shade on polyester fibers such as polyethylene terephthalate. Few green and blue dyes for polyester fibers are available, particularly dyes having the excellent fastness and sublimation properties of the dyestuffs of the present invention. The difficulty of providing green and blue dyestuffs having the desired properties for coloring polyester fibers is evidenced by the scarcity of reference to such dyestuffs in the literature and the general lack of availability for commercial use of such dyestuffs.

For dyeing, the said dyestuffs are preferably used in a finely divided form and the dyeing is carried out in the presence of a dispersing agent such as sulfite cellulose waste liquor or a synthetic detergent, or a combination of different wetting and dispersing agents. Before dyeing, it is generally of advantage to convert the dyestuff to be used into a dyestuff preparation which contains a dispersing agent and the finely divided dyestuff in such a form as to yield a fine dispersion when the preparation is diluted with water. Dyestuff preparations of this kind can be made by known methods, for example, by grinding the dyestuff either in dry or wet form with or without the addition of a dispersing agent.

The dyestuffs of the present invention are particularly adapted for dyeing by the so-called thermofixation or Pad/Thermofix method, in which the fabric to be dyed is impregnated advantageously at a temperature not exceeding 60° C. with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff employed is fixed by subjecting the impregnated fabric to a heat treatment at temperatures above 100° C., for example, at a temperature ranging from 120–220° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example, a direct dyestuff or vat dyestuff, or more especially a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used the padded fabric must be treated, after the heat treatment, with an aqueous alkaline solution, of a reducing agent of the kind used in vat dyeing.

The dyeings produced on polyester fibers by the process of the invention are advantageously given an aftertreatment, for example, by heating them with an aqueous solution of a non-ionic detergent.

In stead of applying the dyestuffs in the process by impregnation, they may be applied by printing. For this purpose, a printing colour is used which in addition to the usual printing assistants such as wetting and thickening agents, contains the finely dispersed dyestuff, if desired, in admixture with one of the aforesaid cotton dyestuffs, and, if desired, in the presence of urea and/or an agent capable of binding acid.

There are obtained by the practice of the present invention strong dyeing or prints having excellent fastness properties, especially a good fastness to sublimation and to light.

The term polyester defines synthetic polymeric polyesters such as the highly polymeric linear polyesters, the molecules of which have recurring monomeric units connected by ester linkages. Dibasic acids, for example, aromatic acids such as terephthalic acid, diphenyl-4,4'-dicarboxylic acid and/or diphenylsulfone-4,4'-dicarboxylic acid and dihydroxy compounds, for example, glycols such as ethylene glycol, diethylene glycol, triethylene glycol, propylene glycol and/or butylene glycol, as well as other diols, such as 1,4-cyclhexyldiol can be used as the monomers to form the polymeric polyesters. Typical commercial examples of such fibers are Dacron, Terylene, Fortrel, Trevira, Terlanca, Kodel, Vycron, etc. They are disclosed, for example, in U.S. Patent No. 2,901,466 and British Patents Nos. 578,079, 579,462, 588,411, 588,497 and 596,688.

The present invention is, of course, equally applicable to the dyeing of blends of polyester fibers and cellulosic fibers. The latter term includes native cellulose, such as linen or more particularly cotton, as well as regenerated cellulose, such as fiscose or cuprammonium rayon.

The following examples illustrate the invention, the parts and percentages being by weight.

EXAMPLE 1

20 parts of 6-amino-7-bromo-naphth(2,3-c)acridan-5,8,14-trione, 6 parts of cuprous cyanide, 50 parts of pyridine, and 180 parts of nitrobenzene are heated for 12 hours at 158° C. to 160° C. The mixture is then cooled to room temperature and the batch is suction-filtered to yield a cake from which the residual nitrobenzene is separated by steam distillation. The dye is then isolated by filtration and dried. 6 - amino - 7 - cyano - naphth(2,3-c)acridan-5,8,14-trione is obtained in a yield of 14 parts (81% of the theoretical yield).

The 6 - amino - 7 - bromo - naphth(2,3 - c)acridan-5,8,14-trione employed as a starting material in the above example is described in the following literature:

Friedlander 11, 678 (1912–14), German Patent No. 256,626, Berichte 49, 2156.

EXAMPLE 2

10 parts of the dyestuff of Example 1 are brought to a state of fine dispersion by milling in a ball mill with 2.5 parts of the condensation product of naphthalene-2-sulfonic acid with formaldehyde, 7.5 parts of sorbitol (other polyalcohols can also be employed), and 50 parts of water.

An amount of this preparation sufficient to provide a concentration of 3 grams of dyestuff per liter of dye bath is finely dispersed in water containing 0.5 g. of sodium alginate per liter and the resultant pad liquor is brought to a temperature of 25° C.

A polyester fabric from ethylene glycol and terephthalic acid is then padded with the above liquor and mechanically squeezed to a 65% pick up. The padded material is then air dried and developed by dry heat curing for 1 minute at 200° C. The dyed fabric is then cold rinsed, scoured and finally dried. A bright green dyeing is obtained having very good wash-fastness and excellent fastness to sublimation and to light.

EXAMPLE 3

20 parts of 6 - amino - 7 - cyanonaphth(2,3 - c)acridan-5,8,14-trione are added to 500 parts of 89% sulfuric acid over a period of 30–45 minutes. The mixture is stirred and heated for 5 hours at 120 to 123° C. The resulting brown solution is poured into a mixture of ice and water and the resulting mixture is suction-filtered to yield a blue presscake which is washed free of acid (by Congo red test) with water and then dried in an oven at 110° C.

The yield of dry 6 - aminonaphth(2,3 - c)acridan - 5,8,14-trione-7-carboxamide is 18 parts (86% of the theoretical yield). The compound analyzes for nitrogen as follows: Calculated percent nitrogen for $C_{22}H_{13}N_3O_4$, 11.0%; found percent nitrogen, 10.5%.

EXAMPLE 4

10 parts of the dyestuff of Example 3 are brought to a state of fine dispersion by milling in a ball mill with 2.5 parts of the condensation product of naphthalene-2-sulfonic acid with formaldehyde, 7.5 parts of sorbitol (other polyalcohols can also be employed), and 50 parts of water.

An amount of this preparation sufficient to provide a concentration of 3 grams of dyestuff per liter of dye bath is finely dispersed in water containing 0.5 g. of sodium alginate per liter and the resultant pad liquor is brought to a temperature of 25° C.

A polyester fabric from ethylene glycol and terephthalic acid is then padded with the above liquor and mechanically squeezed to a 65% pickup. The padded material is then air dried and developed by dry heat curing for 1 minute at 200° C. The dyed fabric is then cooled rinsed, scoured and finely dried. A bright greenish blue dyeing is obtained having a very good wash-fastness and excellent fastness to sublimation and to light.

What is claimed is:

1. A compound of the formula:

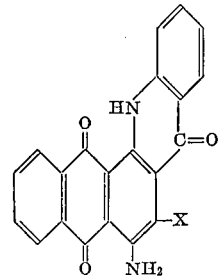

in which X is a member selected from the group consisting of cyano and carboxamide.

2. 6-amino-7-cyanonaphth(2,3-c)acridan-5,8,14-trione.

3. 6-aminonaphth(2,3-c)acridan - 5,8,14 - trione-7-carboxamide.

References Cited by the Examiner

UNITED STATES PATENTS

| | | | |
|---|---|---|---|
| 2,481,744 | 9/1949 | Heslop et al. | 260—276 |
| 2,752,349 | 6/1956 | Zerweck et al. | 260—276 |
| 2,918,344 | 12/1959 | Jenny | 8—39 |
| 3,087,773 | 4/1963 | Straley et al. | 8—39 |

FOREIGN PATENTS 944,513 12/1963 Great Britain.

OTHER REFERENCES

Albert, The Acridines, 1951, page 246, Edward Arnold & Co., London.

ALEX MAZEL, *Primary Examiner.*

NORMAN TORCHIN, HENRY R. JILES, *Examiners.*

J. HERBERT, D. G. DAUS, *Assistant Examiners.*